United States Patent
Nachenburg (10) Patent No.: US 8,100,322 B1
(45) Date of Patent: Jan. 24, 2012

(54) SYSTEMS, APPARATUS, AND METHODS FOR OBTAINING SATISFACTION RATINGS FOR ONLINE PURCHASES

(75) Inventor: Carey Nachenburg, Manhattan Beach, CA (US)

(73) Assignee: Symantec Corporation, Mountain View, CA (US)

(*) Notice: Subject to any disclaimer, the term of this patent is extended or adjusted under 35 U.S.C. 154(b) by 1064 days.

(21) Appl. No.: 11/963,965

(22) Filed: Dec. 24, 2007

(51) Int. Cl.
  *G06F 7/00* (2006.01)
  *G06Q 10/00* (2006.01)
(52) U.S. Cl. ....... 235/376; 705/7.31; 705/7.32; 707/758
(58) Field of Classification Search ................. 235/375, 235/376; 705/7.31, 7.32; 707/758
See application file for complete search history.

(56) References Cited

U.S. PATENT DOCUMENTS

| | | | | |
|---|---|---|---|---|
| 5,950,172 | A * | 9/1999 | Klingman | 705/27.1 |
| 6,102,287 | A * | 8/2000 | Matyas, Jr. | 235/380 |
| 6,236,990 | B1 * | 5/2001 | Geller et al. | 1/1 |
| 6,963,848 | B1 * | 11/2005 | Brinkerhoff | 705/7.32 |
| 7,376,570 | B2 * | 5/2008 | Sone | 705/1.1 |
| 7,483,844 | B2 * | 1/2009 | Takakura et al. | 705/26.7 |
| 7,613,634 | B2 * | 11/2009 | Siegel et al. | 705/26.62 |
| 7,707,062 | B2 * | 4/2010 | Abramowicz | 705/7.31 |
| 7,722,081 | B2 * | 5/2010 | Van Druff et al. | 280/801.2 |
| 7,890,378 | B2 * | 2/2011 | Clarke et al. | 705/26.8 |
| 7,912,755 | B2 * | 3/2011 | Perry et al. | 705/26.8 |
| 7,996,252 | B2 * | 8/2011 | Shahrabi et al. | 705/7.32 |
| 2007/0214000 | A1 * | 9/2007 | Shahrabi et al. | 705/1 |

* cited by examiner

*Primary Examiner* — Andrew Joseph Rudy
(74) *Attorney, Agent, or Firm* — Advantedge Law Group (57) ABSTRACT

Systems, apparatus, and methods are disclosed for collecting and combining consumer satisfaction ratings for online purchases. Users may be prompted for purchase satisfaction after an expected delivery date. Information from one or more user responses may then be compiled and used to rate online vendors.

20 Claims, 7 Drawing Sheets

SYSTEMS, APPARATUS, AND METHODS FOR OBTAINING SATISFACTION RATINGS FOR ONLINE PURCHASES

BACKGROUND INFORMATION

The reputation of a vendor is an important factor in consumer decision making. Buyers commonly reference user reviews, internet forums, and the Better Business Bureau when selecting a vendor. Unfortunately, forums and user reviews may be influenced by vendor interests and marketing campaigns. Composite information may not be easily accessible and often requires extensive research on the part of a user.

The reporting services of bureaus and agencies are similarly constrained. The process of submitting a review is often tedious and incomplete. User feedback is typically scarce, even for well established vendors. Determining legitimacy and organizational performance can be difficult, as evidenced by the increasing number of internet fraud cases. The current feedback tools fail to provide adequate information to notify and protect users that make online purchases.

BRIEF DESCRIPTION OF THE DRAWINGS

Various embodiments are described with reference to the accompanying drawings, wherein like reference numbers designate like elements, and in which.

DETAILED DESCRIPTION

The disclosure is directed to systems, apparatus, and methods for rating and analyzing vendors that have an online presence.

It should be appreciated that the examples disclosed herein can be implemented in numerous ways, including as one or more processes, apparatuses, systems, devices, methods, computer readable media, or computer interface products embodied on computer readable media.

Systems, apparatus, and methods are disclosed that may efficiently obtain and compile satisfaction ratings for online purchases. Certain embodiments determine dates that services or products are to be delivered and automatically prompt users for feedback. Certain embodiments provide users with information to make an informed decision about an internet purchase by automatically displaying a reputation rating to the user as they visit a vendor's website.

Embodiments described herein will be best understood by reference to the drawings. It will be readily understood that the components generally described and illustrated in the drawings herein, could be arranged and designed in a variety of different configurations. Thus, the following detailed description, as represented in the drawings, is not intended to limit the scope of the disclosure but is merely representative of certain embodiments.

Many of the functional units described in this specification have been explicitly labeled as modules (while others are assumed to be modules), in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
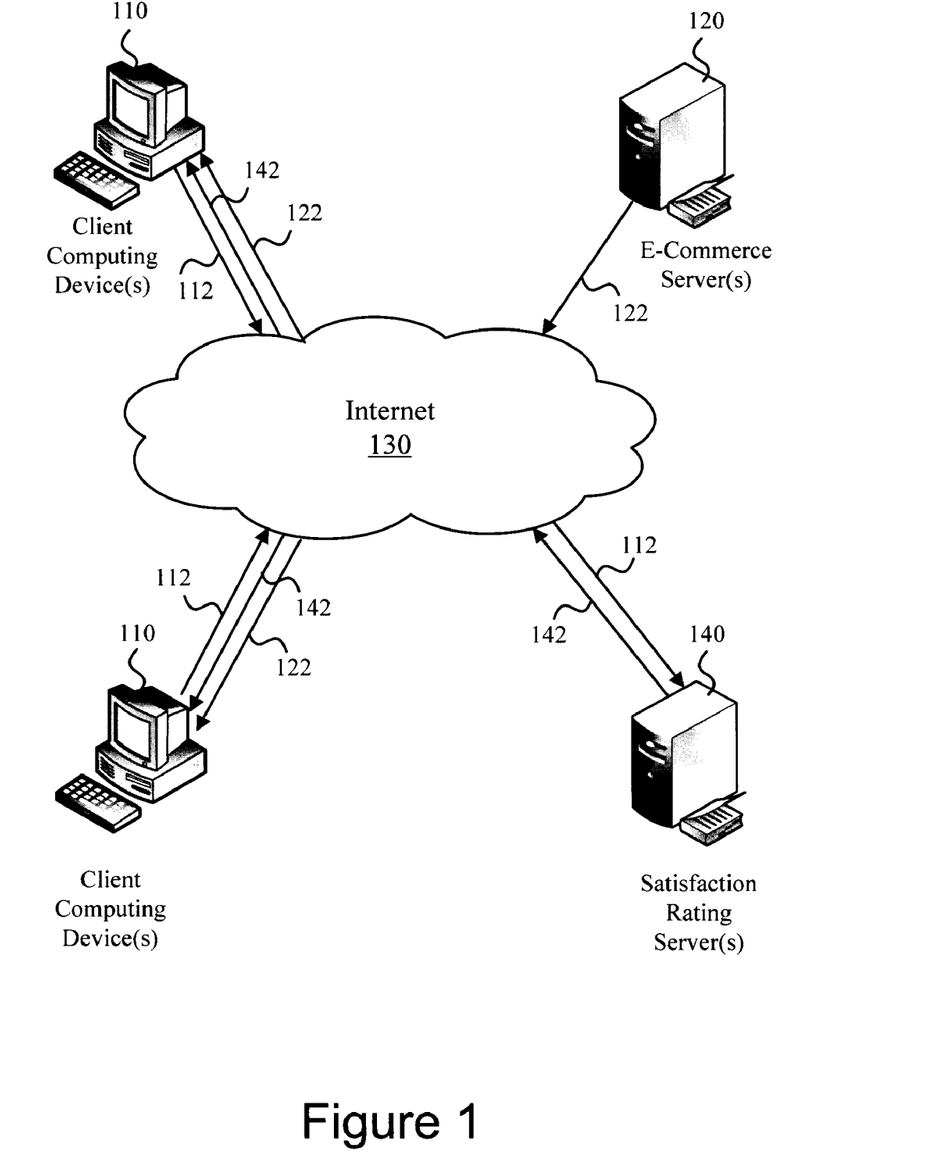
FIG. 1 is a block diagram depicting one embodiment of a satisfaction rating system.

FIG. 1 is a block diagram depicting one embodiment of a satisfaction rating system 100. As depicted, the satisfaction rating system 100 includes a client computing device 110, an e-commerce server 120, an internetwork such as the internet 130, and a satisfaction rating server 140. The satisfaction rating system 100 enables customer satisfaction information to be recorded and sent to one or more servers 140 that aggregate satisfaction information. In turn, compiled information may be returned to the client computing device(s) 110 to enable users to make well informed consumer decisions.

In the embodiment shown, the client computing device 110 initiates a transaction with a server such as the e-commerce server 120. The e-commerce server 120 may facilitate the buying and selling of tangible or intangible products and/or services. For example, the e-commerce server 120 may engage in retail sales, electronic funds transfer, supply chain management, internet marketing, online transaction processing, an electronic data interchange processes, or the like.

Purchase confirmation information 122 may be sent by the e-commerce server 120 to a client computing device 110 through the internet 130. The confirmation information 122 may include information relevant to the purchase, such as a transaction amount or approximate shipping date. Additionally, the confirmation information 122 may include information to uniquely identify a vendor or a division of a corporation. For example, the confirmation information 122 may serve to distinguish affiliated vendors from a marketplace parent site such as Ebay.com or Amazon.com. Separating individual vendors from marketplace organizations improves the quality of rating information.

In certain embodiments, the purchase confirmation information 122 is transmitted as html, xml, or other information adhering to a document object model. By using standard html or xml packets, the client computing device may be able to receive and parse information without altering the standard flow of information between an e-commerce server 120 and a client computing device 110.

In additional configurations, the confirmation 122 may be transmitted across the internet 130 through means other than the world wide web. For example, a confirmation packet 122 may be sent using FTP, email, SMS, or paging protocols. By implementing transaction monitoring across multiple protocols, the depicted embodiment may be deployed on many different client computing devices and monitor a wide range of transaction types. For example, business to business transactions may be handled using a batch ftp configuration or equivalent http process. Various examples disclosed herein may generate satisfaction ratings from such file interchanges and other protocols outside the scope of the world wide web.

The client computing device 110 may transmit extracted satisfaction information 112 to a satisfaction rating server 140 via the internet 130. In one embodiment, the satisfaction rating server 140 provides an interface for the collection of user responses. In another embodiment, a user interface for providing user responses is generated by the client computing device 110.

The satisfaction rating server 140 may receive and aggregate purchase satisfaction information transmitted from one or more computing devices 110. The satisfaction rating server 140 may include both storage and application components. In one embodiment, the storage portion of the logical server is a separate physical device from the application server. The satisfaction rating server 140 may set constraints on the satisfaction information. In certain embodiments, the constraints may be geographically or IP based to ensure that satisfaction responses are tied to actual consumers.

The satisfaction rating server 140 may send composite ratings 142 back to the client computing devices 110. The composite ratings 142 may depend on the current content being displayed on the client computing device 110. For example, transactions relating to banking between the client computing device 110 and the e-commerce server 120 may call for composite ratings 142 for a specific bank as well as other similar organizations in the industry. The composite ratings 142 may provide an accurate assessment of a vendor and provide alternatives to assist the consumer with purchasing decisions. The composite ratings 142 may be embodied as a web page, email, content feed, text message, data stream, or similar data transfer mechanism.

Figure 2:
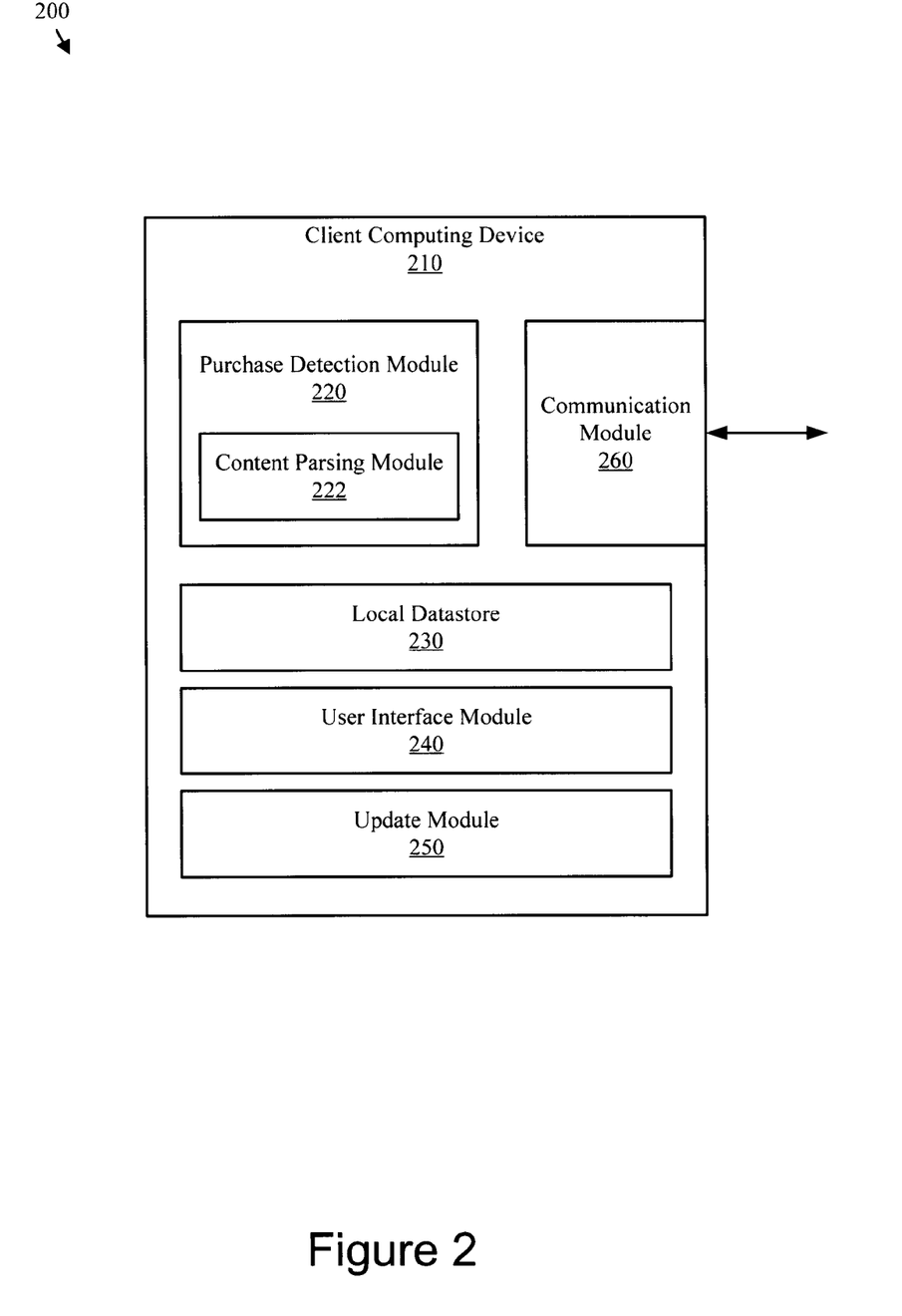
FIG. 2 is a block diagram depicting one embodiment of a satisfaction rating apparatus.

FIG. 2 is a block diagram depicting one embodiment of a satisfaction rating apparatus 200. As depicted, the satisfaction rating apparatus 200 includes a client computing device 210 with a purchase detection module 220, a content parsing module 222, a local datastore 230, a user interface module 240, an update module 250, and a communication module 260. The satisfaction rating apparatus 200 enables users to submit and receive purchase related information and is one example of a client computing device 110 depicted in FIG. 1.

The depicted satisfaction rating apparatus 200 may operate on the client computing device as a standalone executable/interface or may be part of a larger software package. Adding the depicted embodiment to an existing software package enhances the value of the package and encourages rapid implementation on a large scale. Specifically, the installation may be bundled with existing packages such as Norton 460, Norton Confidential, NIS, internet browsers, and the like.

The depicted purchase detection module 220 examines content and data streams to determine if purchase data is included therein. The content parsing module 222 may extract data such as URLs, purchase dates, expected delivery time or date, specific seller or auctioneer, item descriptions, pricings, screenshots, security reports, javascript errors, and the like from web pages or other application user interfaces displayed to the user. In one particular embodiment, the content parsing module 222 uses regular expressions to determine when a credit card is entered. By detecting a credit card entry, the content parsing module 222 may begin to monitor client-server transactions. In another embodiment, a transaction may be evidenced by xml or html content after the transaction has occurred. In such cases, regular expressions may be implemented on a DOM tree or the like to extract transaction information.

In certain embodiments, a local datastore 230 holds information relating to the purchase. The local datastore may store temporary information used in determining an appropriate date and time to prompt the user for feedback. The local datastore 230 may be implemented in the form of an xml document, a database environment such as SQL, or a similar storage mechanism.

In certain embodiments, the user interface module 240 references the local datastore 230 to generate a survey or feedback dialog relating to a purchase at an appropriate time such as a day after the expected delivery date of the purchased product. Implementing survey generation on the client computing device 210 reduces server load and eliminates the unnecessary storage of transactions without user feedback. Additionally, storing information on the client enables users to keep information private.

The user interface module 240 may prompt a user periodically for identity theft information as well. This information may be sent to the server and correlated with information from other users in order to identify vendors that have a high incidence of identity theft. In certain embodiments, the user interface module 240 also presents the user with information relating to a vendor as well as URLs for more detailed information. For example, when a user visits a new web page, they can be provided with reputation information on the vendor in question in order to inform them of the vendor's reputation prior to making a purchase. In addition to the global ranking of the vendor, the user's own ratings may also be displayed e.g., "while the average user rated this site a 3/10, your average rating over 6 transactions is 8/10. In certain embodiments, the user interface module 240 is packaged as a browser toolbar or a rich internet application.

The user interface 240 may be regularly updated via the update module 250. Both algorithms and appearance may be altered by the update module 250. Additionally, the update module 250 may be configured to auto-detect changes in browser versions and html rendering engines. For example, an update to a browser may necessitate a security revision or layout alteration. The update module 250 may be configured to generate update notifications, display a link for a new download, or execute an automatic update process.

The satisfaction rating apparatus may include a communication module 260 that transmits and receives data between the client computing device 210 and a satisfaction rating server 140 or the like. In addition to transmitting user feedback and transaction information, the communication module 260 may also initiate a request for specific information relating to pre-existing content or content being downloaded from a third party.

Figure 3:
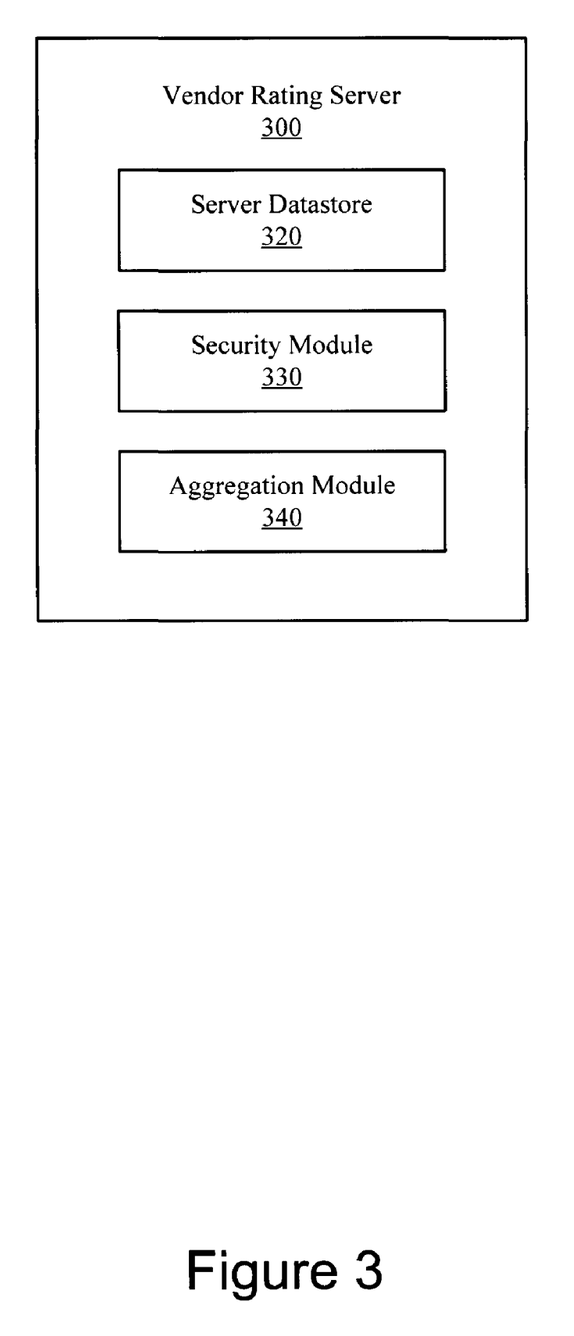
FIG. 3 is a block diagram depicting one embodiment of a vendor rating server.

FIG. 3 is a block diagram depicting one embodiment of a vendor rating server 300. The depicted vendor rating server 300 includes a server datastore 320, a security module 330, and an aggregation module 340. The vendor rating server 300 enables submitted ratings to be combined and redistributed to interested consumers and is one example of the satisfaction rating server 140 depicted in FIG. 1.

The depicted vendor rating server 300 compiles information relating to purchase ratings. User feedback may be stored in a server datastore 320. The server datastore 320 may be configured to hold completed satisfaction surveys as well as transactional information awaiting review. In certain embodiments, the vendor rating server 300 analyzes records in the server datastore 320 that have been associated with identity theft. The vendor rating server 300 may determine vendors that are leaking credit card, social security, or other personal information.

A security module 330 may also be implemented as part of the vendor rating server 300. Security may be provided via SSL certificates or the like. The security module 330 may be responsible for ensuring that all transmissions to and from the server are encrypted.

The aggregation module 340 may compile information submitted from multiple sources and may generate composite reports. The vendor rating server 300 may also determine overall satisfaction percentages via the aggregation module 340. For example, "95% of orders on xyz.com were delivered on time," or "98% of customers on xyz.com were satisfied with their purchase." Additionally, the vendor rating server 300 may dynamically generate information and provide links to more complete user feedback information. For example, a link may be generated that brings up a display of records for the past 90 days or an analysis of the vendor's position in relation to industry averages. A low satisfaction rating may be high compared to others in the same consumer market or may indicate that another vendor provides a superior service. Providing access to relative ratings compiled by the aggregation module 340 may enhance the functionality of the vendor rating server 300.

Figure 4:
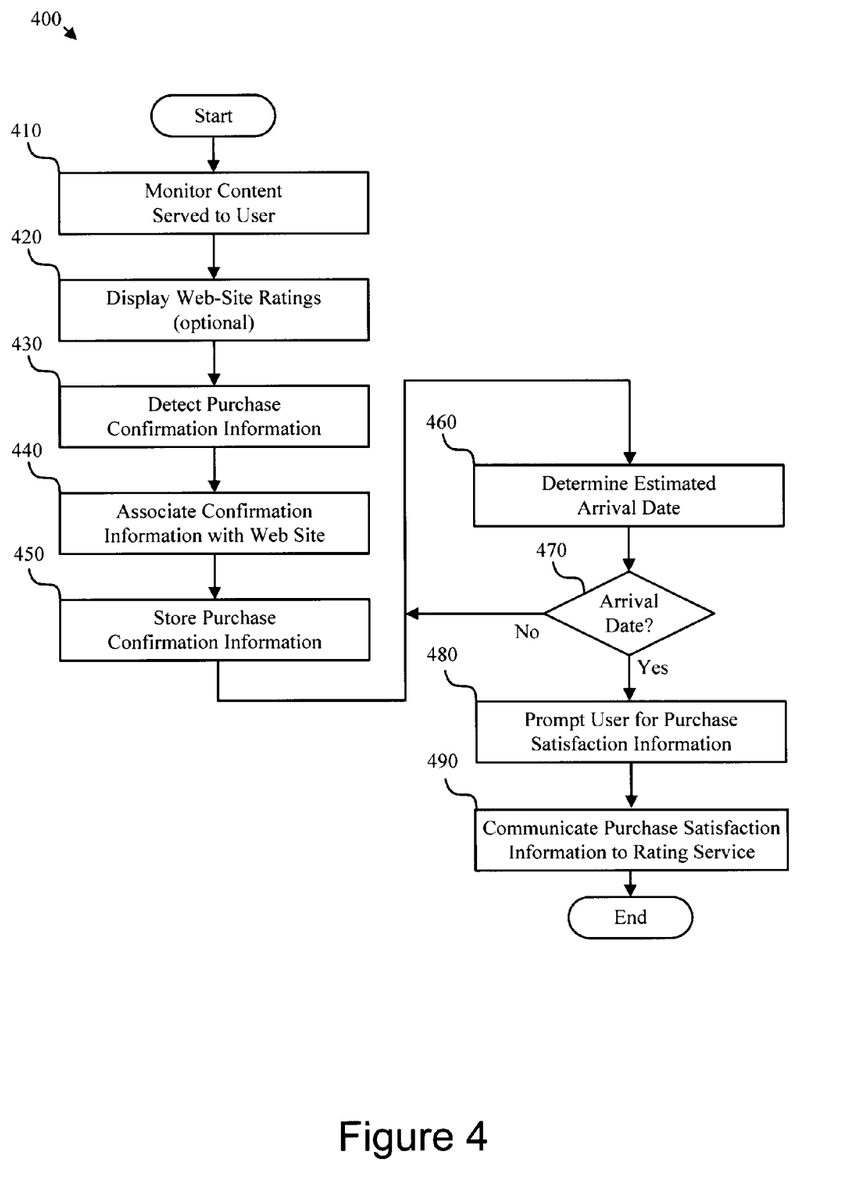
FIG. 4 is a schematic flow chart diagram illustrating embodiments of a method for providing satisfaction ratings.

FIG. 4 is a schematic flow chart diagram illustrating embodiments of a method 400 for obtaining satisfaction ratings for online purchases. As depicted, the method 400 includes monitoring 410 content served to a user, optionally displaying 420 web-site ratings, detecting 430 purchase confirmation information, associating 440 confirmation information with a web site, storing 450 purchase confirmation information, determining 460 an estimated arrival date, determining 470 if the arrival date has passed, prompting 480 the user for purchase satisfaction information, and communicating 490 purchase satisfaction information to a rating service. The method 400 is described from the perspective of a client computing device 110 and enables efficient collection of purchase satisfaction information.

Monitoring 410 content served to a user may include parsing content or data streams provided to a user. Monitoring 410 content may include examining pages served by a webserver, for example, or monitoring additional forms of data delivery, such as content feeds, files, emails, and SMS messages. In situations where content is delivered via webpages, the URL, site headings, or metatags of the webpages may be used to associate a particular website with a vendor. In one embodiment, domain registration information may be accessed to obtain or verify site ownership information.

Ratings may be displayed 420 for websites and/or vendors. Monitoring content 410 and displaying 420 web-site ratings may occur continually, even when purchase confirmation information is not detected 430. Using an AJAX format or other dynamic content delivery mechanism may provide regularly updated ratings without interfering with page loading processes.

The method 400 may also include detecting 430 purchase confirmation information and associating 440 confirmation information with a website and/or vendor. Several websites may be associated with the same vendor. The method may further include storing 450 purchase confirmation information in a local datastore. Storing purchase confirmation information may be handled by a client based executable, including, but not limited to, Java, compiled object code, AdobeAIR, and the like.

In certain embodiments, the method 400 for obtaining satisfaction ratings includes determining 460 an estimated arrival date for a purchase. In certain embodiments, the arrival date is determined to be the current date. If the product is virtual or downloadable, for example, there may be no delay in product delivery. In other cases, however, an estimated arrival may be derived. Various shipping services may have different expected delays in delivery. For example, FedEx may offer an overnight option while UPS ground may offer delivery in several days. Determining 460 an estimated arrival date may include combining the shipping delay with the date of purchase to estimate an expected arrival date. In certain embodiments, a third party shipping analyzer or an average shipping time may be used in the calculations.

If the expected or extracted arrival date matches 470 the current date, the user may be prompted 480 for purchase satisfaction information. Prompting 470 a user may include generating an html form or formatted survey to collect information relating to the purchase. When the satisfaction information survey is complete, the purchase satisfaction information may be communicated 490 to a rating service.

Figure 5:
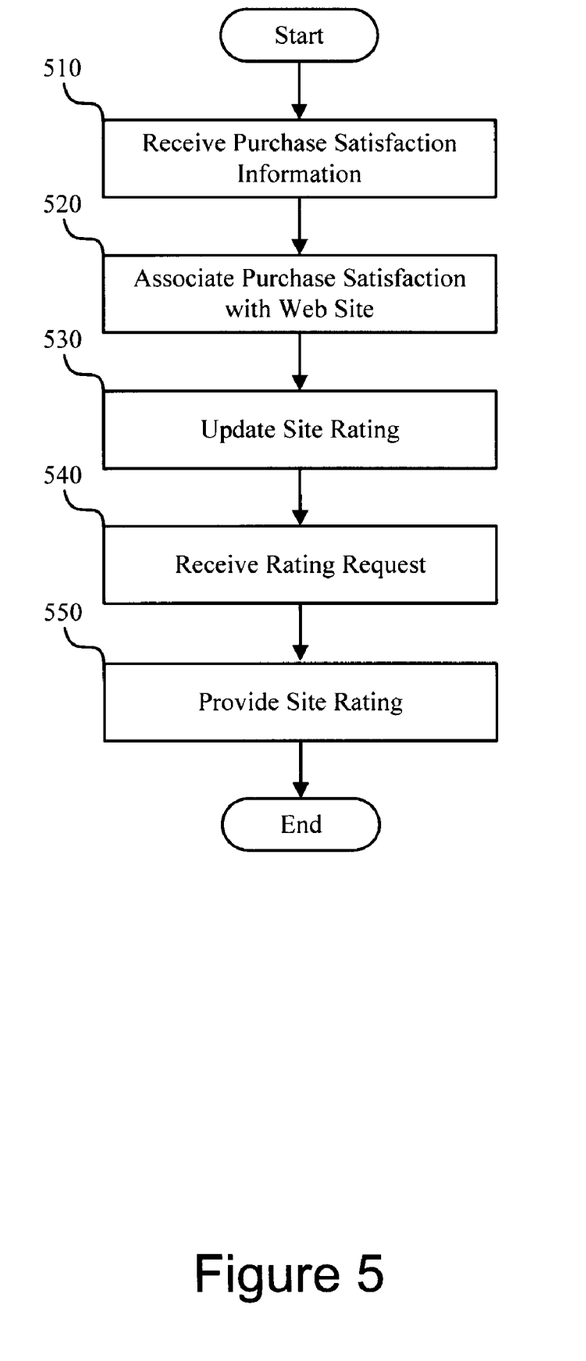
FIG. 5 is a schematic flow chart diagram illustrating embodiments of a method for providing satisfaction ratings.

FIG. 5 is a schematic flow chart diagram illustrating one embodiment of a method 500 for providing satisfaction ratings for online purchases from the perspective of a satisfaction rating server 140 or the like. As depicted, the method 500 includes receiving 510 purchase satisfaction information, associating 520 purchase satisfaction information with a website, updating 530 a site rating, receiving 540 a rating request, and providing 550 a site rating. The method 500 enables the receipt, aggregation, and delivery of site specific satisfaction ratings.

Receiving 510 purchase satisfaction information may include accepting data from a remote computing device such as a client computing device 110. In certain embodiments, the received data may be in a format consistent with websites, such as data corresponding to get and post transactions. In addition, the accepted data may be in an alternate format such as an email or SMS message. In cases where user satisfaction information is transmitted via a message or data stream, receiving 510 purchase satisfaction information may include parsing and storing the data received from a communication service.

The method 500 may further include associating 520 purchase satisfaction information with a website and updating 530 a site rating. Updating a site rating 530 may include amending information or appending data to a database that may be used in subsequent rating calculations. In certain embodiments, websites from a common vendor are associated together in the database. In further embodiments, rating requests are received 540 by the server. The rating requests may be search strings that the server uses to conduct queries on a specific vendor or industry. Using the rating request parameters, the server may additionally provide 550 a site rating.

Figure 6:
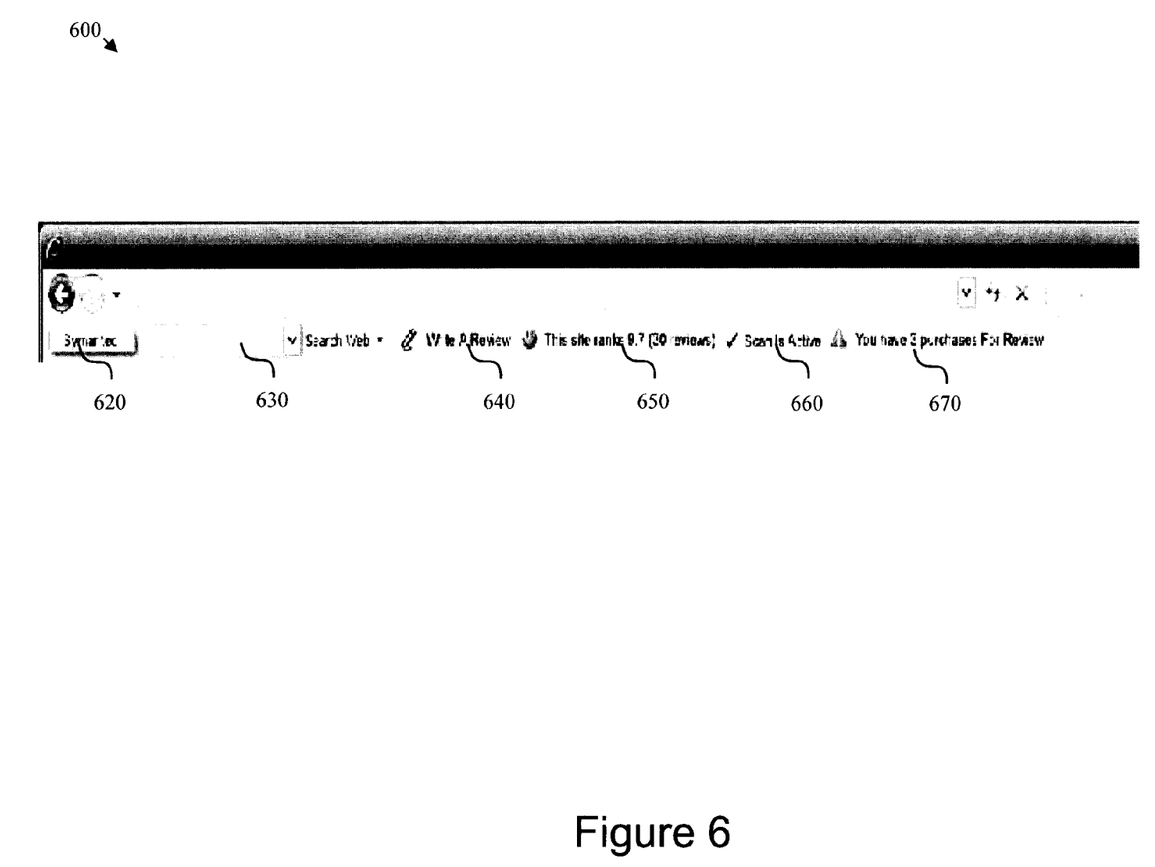
FIGS. 6-7 are screenshots depicting examples of satisfaction rating interfaces.

FIG. 6 is a screenshot of one embodiment of a satisfaction rating interface 600. As depicted, the satisfaction rating interface 600 includes an update control 620, a search field 630, a review form activation control 640, a site ranking 650, a toolbar mode control 660, and a status bar 670. The satisfaction rating interface 600 is one example of an interface that enables users to send satisfaction ratings and retrieve information related to the current website.

The depicted satisfaction rating interface 600 is embodied as a browser add-on or plug-in. Although the satisfaction rating interface 600 is depicted as a toolbar within a browser, the interface may be provided by a standalone executable or background process. The update control 620 manages the version and appearance of the toolbar and associated software. Activation of the update control 620 may cause a web server to push business logic or display updates to a user's browser. In one embodiment, updates are managed independent of an update control 620. For example, the update control 620 may be tied to a browser's scheduled update manager. In certain embodiments, the update control 620 displays a prompt or URL for downloading updated content.

A search field 630 may be included in the satisfaction rating interface 600. The search field 630 may be a form field that relays variables to a search engine, or may be used to provide query parameters for locally or remotely stored data relating to purchase satisfaction information. In certain embodiments, the search field 630 is tied to ad revenue algorithms or a similar third party service.

In certain embodiments, a review form activation control 640 is embedded into the toolbar. The review form activation control 640 may be a button or link that activates a review form enabling a user to manually initiate a review process. The user may record or transmit a transaction that is not automatically monitored, enabling review processes for customer service or certain types of virtual transactions. In certain embodiments, manual reviews are disabled to preserve the integrity of transactional reporting.

A site ranking 650 may also be displayed in the satisfaction rating interface 600. The site ranking 650 may be represented through the use of icons, percentages, or a relative positioning scheme, such as the rating systems provided by Alexa Internet, Inc. This ranking may include a global ranking derived by the system as well as a rating derived solely from the user's own feedback about the system. Additionally, the site ranking 650 may be a link to composite scores and reports corresponding to the current content. In certain embodiments, the site ranking 650 is generated using additional remote databases, such as Amazon's vendor ratings or Better Business Bureau feeds.

A toolbar mode control 660 may be included in the satisfaction rating interface 600. The toolbar mode control 660 may be used to hide a portion of the satisfaction rating interface 600 or to turn off automatic transaction scanning. Additionally, a status bar 670 may be included in the satisfaction rating interface 600. The status bar 670 may indicate when a transaction is ready to be reviewed and provide a local file path or URL for a review form.

Figure 7:
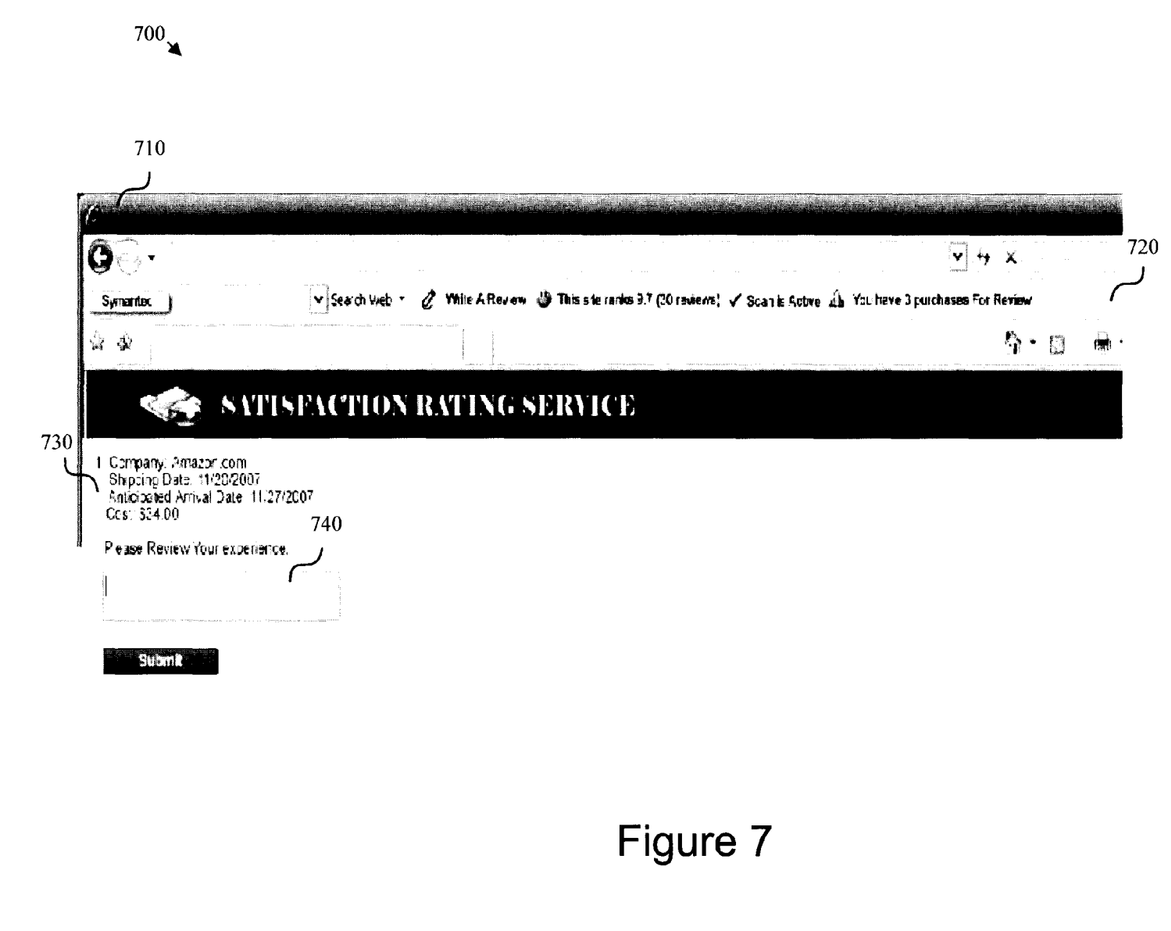

FIG. 7 is a screenshot of one embodiment of a satisfaction rating interface 700. As depicted, the satisfaction rating interface 700 includes a toolbar 720, rendered transaction data 730, and form fields 740. The depicted satisfaction rating interface 700 provides a mechanism for consumers to submit reviews and transaction data.

As depicted, the satisfaction rating interface 700 may be provided by an existing executable. The satisfaction rating interface 710 may be as simple as a screen for typing text, such as the interfaces provided by mobile devices. The satisfaction rating interface may also include a toolbar 720, as depicted in FIG. 6.

In certain embodiments, rendered transaction data 730 is displayed or transmitted to the user to enable proper identification of the transaction. Transaction data may include, but is not limited to, the purchaser's name, date of purchase, date of delivery, vendor, website, and pricing for the transaction. The price may give more weight or meaning to a specific item on a transactional report. For example, a $600 purchase may generate a rating that is weighted more than a rating corresponding to a $5 purchase. Giving each transaction an appropriate weight may prevent a vendor from skewing results by adding independent small item purchases. Additionally, transmitting pricing enables determination of an expected price range for a particular industry.

Form fields 740 may be implemented to enable input of user responses. In certain embodiments, the satisfaction rating interface 700 enables users to retroactively edit responses. In the case of retroactive editing, the form fields 740 and rendered transaction data 730 may correspond to information about past purchases. The form fields 740 may display rating information previously entered by a user and may enable the user to edit the content. The rendered transaction data 730 and content for the populated form fields 740 may come from a local datastore or an entry in a satisfaction rating server as depicted in FIG. 1.

The preceding description has been presented only to illustrate and describe exemplary embodiments and implementations with reference to the accompanying drawings. It will, however, be evident that various modifications and changes may be made thereto, and additional implementations may be implemented, without departing from the scope of the invention as set forth in the claims that follow. The above description and accompanying drawings are accordingly to be regarded in an illustrative rather than a restrictive sense.

What is claimed is:

1. A system for obtaining satisfaction ratings for online purchases, the system comprising:
   a vendor rating server configured to receive purchase satisfaction information provided by users of computing devices;
   the vendor rating server further configured to calculate vendor ratings based on the purchase satisfaction information provided by the users;
   the vendor rating server further configured to transmit the purchase satisfaction information and the vendor ratings to the computing devices;
   a computing device configured to monitor content served to a user, detect purchase confirmation information for a particular purchase within the content, and determine an estimated arrival date for the particular purchase from the purchase confirmation information;
   the computing device further configured to prompt the user for purchase satisfaction information for the particular purchase on or after the estimated arrival date; and
   the computing device further configured to communicate the purchase satisfaction information for the particular purchase to the vendor rating server.

2. The system of claim 1, further comprising an e-commerce server configured to process a transaction.

3. The system of claim 1, further comprising a merchant gateway.

4. A method for obtaining satisfaction ratings for online purchases, the method comprising:
   monitoring content served to a user;
   detecting purchase confirmation information for a particular purchase within the content;
   determining an estimated arrival date for the particular purchase from the purchase confirmation information;
   prompting the user for purchase satisfaction information for the particular purchase on or after the estimated arrival date; and communicating the purchase satisfaction information for the particular purchase to a vendor rating server, wherein the method is performed by a computing system for obtaining satisfaction ratings, the computing system comprising at least one processor.

5. The method of claim 4, wherein the content is selected from the group consisting of web pages, electronic messages, feeds, data streams, and cached data.

6. The method of claim 4, wherein determining an estimated arrival date includes examining source code.

7. The method of claim 4, further comprising providing access to user reviews.

8. The method of claim 4, further comprising storing the purchase confirmation information in a local datastore.

9. The method of claim 4, further comprising storing the purchase confirmation information in a remote datastore.

10. The method of claim 4, further comprising deriving a vendor rating from satisfaction information submitted by multiple users.

11. The method of claim 4, further comprising displaying previously recorded information from one or more user transactions.

12. The method of claim 4, further comprising enabling the user to retroactively update ratings and reviews.

13. The method of claim 4, further comprising transmitting transaction amounts to the vendor rating server.

14. An apparatus for obtaining satisfaction ratings for online purchases, the apparatus comprising:
a purchase detection module configured to monitor content served to a user, detect purchase confirmation information for a particular purchase within the content, and determine an estimated arrival date for the particular purchase from the purchase confirmation information;
a user interface module configured to prompt a user for purchase satisfaction information for the particular purchase on or after the estimated arrival date; and
a communication module configured to communicate the purchase satisfaction information for the particular purchase to a vendor rating server.

15. The apparatus of claim 14, wherein the user interface module is further configured to display user satisfaction information corresponding to a currently browsed web site.

16. The apparatus of claim 14, wherein the purchase detection module comprises a content parsing module configured to determine information from the group consisting of a date, a transaction amount, and a vendor corresponding to the particular purchase.

17. The apparatus of claim 14, further comprising an update module configured to update user satisfaction information compiled from multiple users and algorithms related to collecting satisfaction information.

18. The apparatus of claim 14, wherein the user interface module is configured to execute within a toolbar framework.

19. The apparatus of claim 14, further comprising a vendor rating server configured to aggregate purchase satisfaction information and compute vendor ratings.

20. The apparatus of claim 14, further comprising a security module configured to encrypt information transmitted to the vendor rating server.

* * * * *